United States Patent
Reuter

(10) Patent No.: US 7,257,941 B1
(45) Date of Patent: Aug. 21, 2007

(54) MODEL BASED DIAGNOSTICS OF AN AFTERTREATMENT FUEL DOSING SYSTEM

(75) Inventor: Johannes Walter Reuter, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/374,699

(22) Filed: Mar. 14, 2006

(51) Int. Cl.
*F01N 3/00* (2006.01)

(52) U.S. Cl. .............................. 60/277; 60/274; 60/276; 60/286; 60/303

(58) Field of Classification Search .................. 60/274, 60/276, 277, 286, 301, 303
See application file for complete search history.

(56) References Cited

U.S. PATENT DOCUMENTS

| | | | |
|---|---|---|---|
| 6,408,616 B1 * | 6/2002 | Mazur et al. ................. | 60/277 |
| 6,487,852 B1 * | 12/2002 | Murphy et al. ................ | 60/286 |
| 6,983,589 B2 * | 1/2006 | Lewis et al. ................... | 60/277 |
| 7,082,753 B2 * | 8/2006 | Dalla Betta et al. .......... | 60/286 |
| 2002/0107651 A1 | 8/2002 | Haller et al. | |
| 2002/0150532 A1 | 10/2002 | Grieve et al. | |
| 2003/0101713 A1 | 6/2003 | Dalla Betta et al. | |
| 2004/0076565 A1 | 4/2004 | Ganhji et al. | |

* cited by examiner

*Primary Examiner*—Thomas Denion
*Assistant Examiner*—Diem Tran
(74) *Attorney, Agent, or Firm*—Paul V. Keller

(57) ABSTRACT

The invention relates to systems and methods of detecting faults in an exhaust line fuel injection system. An expected relationship between a temperature within the exhaust system and a commanded fuel injection rate or amount is compared to an actual relationship in order to detect faults. The temperature is preferably a temperature of, within, or downstream of an exhaust system device that catalyzes an oxidation or partial oxidation reaction of the fuel, such as an oxidation catalyst or a fuel reformer. The expected relationship may be defined in terms of a thermal model of a system comprising the catalytic device. The invention can be used to detect spray quality faults or to detect fuel injector faults without the use of flow meter.

3 Claims, 1 Drawing Sheet

MODEL BASED DIAGNOSTICS OF AN AFTERTREATMENT FUEL DOSING SYSTEM

FIELD OF THE INVENTION

The present invention relates to systems for injecting fuel into exhaust lines for exhaust aftertreatment.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches remove NOx from the vehicle exhaust. These include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn NOx catalysts are unacceptably low.

SCR generally refers to selective catalytic reduction of NOx by ammonia. The reaction takes place even in an oxidizing environment. The NOx can be temporarily stored in an absorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

LNTs are devices with NOx absorbents and catalysts that reduce NOx during regeneration. The absorbent is typically an alkaline earth oxide absorbent, such as $BaCO_3$ and the catalyst is typically a precious metal, such as Pt or Ru. In lean exhaust, the catalyst speeds oxidizing reactions that lead to NOx adsorption. Accumulated NOx is removed and the LNT is regenerated by creating a reducing environment within the LNT. In a reducing environment, the catalyst activates reactions by which adsorbed NOx is reduced and desorbed.

A LNT can produce ammonia during regeneration. Accordingly, it has been proposed to combine a LNT and an ammonia SCR catalyst into one system. Ammonia produced by the LNT during regeneration is captured by the SCR catalyst for subsequent use in reducing NOx, thereby improving conversion efficiency over a stand-alone LNT with no increase in fuel penalty or precious metal usage. U.S. Pat. No. 6,732,507 describes such a system. U.S. Pat. Pub. No. 2004/0076565 describes such systems wherein both components are contained within a single shell or disbursed over one substrate. WO 2004/090296 describes such a system wherein there is an inline reformer upstream of the LNT and the SCR catalyst.

Creating a reducing environment for LNT regeneration involves eliminating most of the oxygen from the exhaust and providing a reducing agent. Except where the engine can be run stoichiometric or rich, a portion of the reductant reacts within the exhaust to consume oxygen. The amount of oxygen to be removed by reaction with reductant can be reduced in various ways. If the engine is equipped with an intake air throttle, the throttle can be used. The transmission gear ratio can be changed to shift the engine to an operating point that produces equal power but contains less oxygen. However, at least in the case of a diesel engine, it is generally necessary to eliminate some of the oxygen in the exhaust by combustion or reforming reactions with reductant that is injected into the exhaust.

Reductant can be injected into the exhaust by the engine or a separate fuel injection device. For example, the engine can inject extra fuel into the exhaust within one or more cylinders prior to expelling the exhaust. Alternatively, or in addition, reductant can be injected into the exhaust downstream of the engine. The latter approach has the advantage that it permits the addition of an aftertreatment system to an existing engine without requiring changes in the engine design or operation.

The reactions between reductant and oxygen can take place in the LNT, although it is generally preferred for the reactions to occur in a catalyst upstream of the LNT, whereby the heat of reaction does not cause large temperature increases within the LNT during regenerations.

U.S. Pat. Pub. No. 2003/0101713 describes an exhaust treatment system with a fuel reformer placed in the exhaust line upstream of a LNT. The reformer includes both oxidation and reforming catalysts. The reformer both removes excess oxygen and converts the diesel fuel reductant into more reactive reformate. For desulfations, heat produced by the reformer is used to raise the LNT to desulfations temperatures. The diesel fuel injection may be pulsed to control the reformer temperature.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations. On board diagnostic systems may be useful in conjunction with the above-described concepts in meeting these objectives. In particular, where an exhaust line fuel injector is used to supply fuel to a fuel reformer for LNT regeneration, a diagnostic system for the fuel injector would be desirable in that a fuel injector would be subject to a number of possible faults. Valves can become stuck, nozzles can become worn, and pipes can break.

SUMMARY

One of the inventor's concepts relates to a method of detecting faults in an exhaust line fuel injection system. The method uses a relationship between a temperature within the exhaust system and a commanded fuel injection rate or amount to detect the fault. The temperature is preferably a temperature of, within, or downstream of an exhaust system device that catalyzes an oxidation or partial oxidation reaction of the fuel, such as an oxidation catalyst or a fuel reformer. An expected relationship is compared to an actual relationship to detect a fault. The expected relationship may be defined in terms of a thermal model of a system comprising the catalytic device. The actual relationship involves an observed value. The observed value may be a measured temperature. Alternatively, where the temperature is essentially fixed by process control, the observed value may be a fuel valve setting, or the like, or a fuel flow rate. A fault is indicated when the discrepancy between the expected relationship and the actual relationship meets a specified criteria. The method can be used to detect fuel injector faults without the use of flow meter.

Another of the inventor's concept relates to a fuel reforming system comprising a fuel reformer, an exhaust fuel injection system, a temperature measuring device, and an electronic controller. The controller is configured to diagnose a condition of the fuel injection system using a thermal model of a system comprising the fuel reformer. The system can be used to diagnose faults in the fuel injection system without relying on a fuel flow meter. The system can also be used to detect spray quality faults.

The primary purpose of this summary has been to present certain of the inventor's concepts in a simplified form to facilitate understanding of the more detailed description that follows. This summary is not a comprehensive description of every one of the inventor's concepts or every combination of the inventor's concepts that can be considered "invention". Other concepts of the inventor will be conveyed to one of ordinary skill in the art by the following detailed description together with the drawings. The specifics disclosed herein may be generalized, narrowed, and combined in various ways with the ultimate statement of what the inventor claims as his invention being reserved for the claims that follow.

DETAILED DESCRIPTION

The various concepts of the inventor are applicable to exhaust line fuel injection systems. An exhaust line fuel injection system supplies fuel to the exhaust from an internal combustion engine. Fuel may be supplied to the exhaust in order to heat an exhaust aftertreatment device and/or to create a reducing atmosphere for regenerating an exhaust aftertreatment device. Examples of devices that may require heating include lean NOx catalysts, LNTs, and DPFs. A reducing atmosphere may be created, for example, to regenerate a LNT. Typical fuels are hydrocarbons such as gasoline and diesel fuels.

An exhaust line fuel injection system typically comprises a pump, a valve, and a nozzle. The pump can be a pump that also supplies fuel to the engine. The valve can control the fuel supply through the nozzle through a degree of opening and/or a fraction of time spent open. The nozzle typically has an orifice that creates a spray that facilitates mixing of the fuel with the exhaust. Baffles or other devices can be used to promote mixing of the fuel with the exhaust within the exhaust line.

Within the exhaust line, the fuel undergoes reactions with oxygen-containing exhaust gas components such as oxygen, steam, and carbon dioxide. These reactions generally take place in a device comprising a catalyst. The device can be any device comprising a suitable catalyst, including for example a fuel reformer, an oxidation catalyst, or a LNT.

The invention is particularly suitable for mobile applications, which include vehicles such as cars and trucks. Mobile applications create exceptional demands for durability and reliability.

Figure 1:
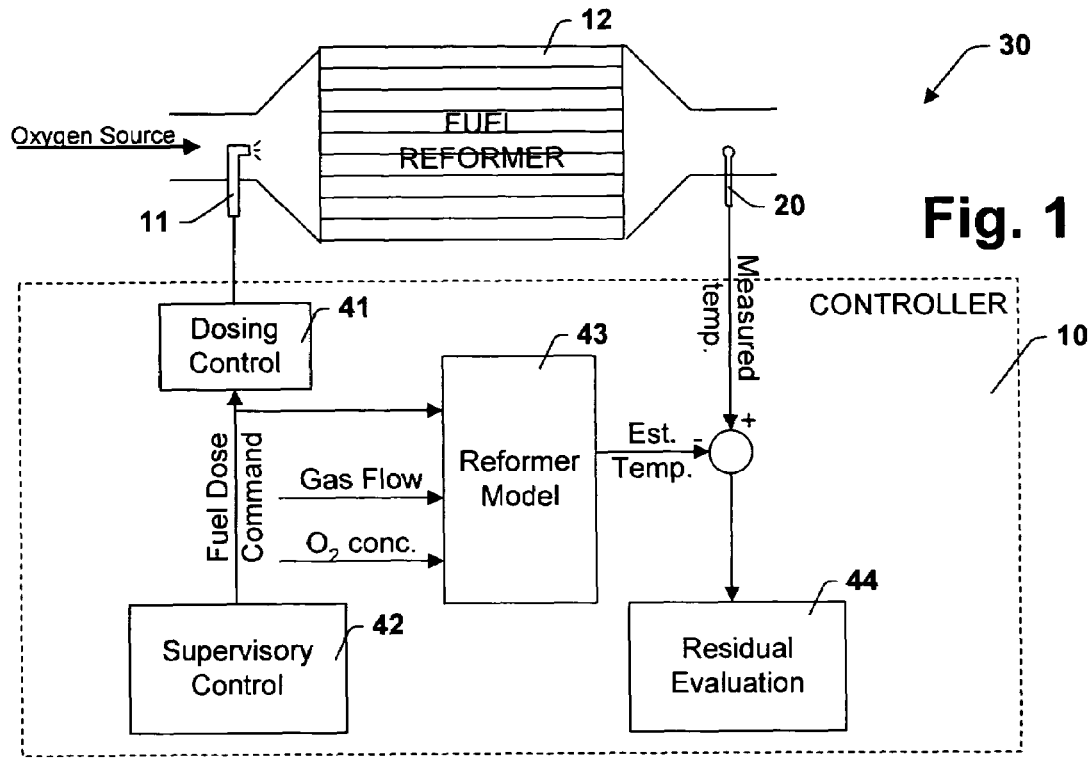
FIG. 1 is a schematic illustration of a fuel injection system fault detection system according to one of the inventor's concepts.

FIG. 1 is a schematic illustration of an exemplary fuel injection system diagnostic apparatus 30. At times and in amounts determined by the supervisory control system 42 and implemented by the dosing control system 41, fuel is dosed to the fuel reformer 12 through the fuel injector 11. The fuel reacts with oxygen-containing compounds in the exhaust within the fuel reformer 12, thereby consuming oxygen, producing reformate, and releasing or adsorbing heat. The sensor 20 detects a temperature, which is a temperature of the reformer exhaust in the illustrated example. The detected temperature is compared to an estimate from the reformer model 43 in the residual evaluation subsystem 44. The comparison is used to detect faults in the fuel injector 11 or related fuel injection system components.

While the system of FIG. 1 is illustrated with the reformer model 43, the inventor contemplates various ways in which an expected relationship between a fueling rate or amount and a temperature could be encoded. Possible approaches include, for example, tables and expert systems in addition to models. A model can be, for example, a learning probabilistic model or a model based on conservation equations. A preferred model comprises a thermal model, which is a model based in part on an energy conservation equation. A thermal model can be zero, one, two, or three-dimensional, although the inventor has found that a zero-dimensional lumped parameter model can suffice.

A lumped parameter model generally includes at least a term for heat convection into the model system, a term for heat convection out of the model system, a term for heat taken up by the catalytic device, and a term for heat generated by chemical reaction. Heat losses to the surrounding can also be considered, but generally have a small effect.

The heat convection rate into the reformer 12 is the production of the exhaust specific heat, the exhaust temperature, and the exhaust mass flow rate. The exhaust mass flow rate can be measured or estimated using an intake air flow rate measurements, an engine fuel flow rate measurement, or simply with data available from the engine control unit (ECU). The temperature of the exhaust entering the reformer 12 can be measured or determined from the engine operating point.

The heat convection rate out of the reformer 12 depends on the temperature of the exhaust leaving the reformer 12. That temperature can be measured. Where the temperature of the reformer 12 is measured, the reformer exhaust gas temperature can be approximated as equally the reformer temperature.

The chemical reactions in the fuel reformer 12 can be modeled as a combination of the three following reactions:

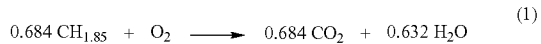

$$0.684\,CH_{1.85} + O_2 \longrightarrow 0.684\,CO_2 + 0.632\,H_2O \quad (1)$$

$$0.316\,CH_{1.85} + 0.316\,H_2O \longrightarrow 0.316\,CO + 0.608\,H_2 \quad (2)$$

$$0.316\,CO + 0.316\,H_2O \longrightarrow 0.316\,CO_2 + 0.316\,H_2 \quad (3)$$

wherein $CH_{1.85}$ represents an exemplary reductant, such as a diesel fuel, with a 1.85 ratio between carbon and hydrogen. Reaction (1) is exothermic complete combustion by which oxygen is consumed. Reaction (2) is endothermic steam reforming, which results in reformate production. Reaction (3) is the water gas shift reaction.

Reaction (1) can be considered to proceed at a rate and to an extent dependent on temperature, oxygen availability where fuel is in excess, fuel availability when oxygen is in excess, but independently of Reaction (2). The oxygen availability depends at least on the oxygen flow rate into the reformer 12. If the reformer 12 has a significant oxygen storage capacity, then it may be desirable to includes terms for the rates of oxygen adsorption and desorption. The oxygen concentration of the exhaust flowing into the reformer 12 can also be measured or estimated using data available from the ECU.

The fuel availability in the reformer 12 is dependent on the fuel supply rate. In addition, the inventor has found that fuel adsorption and desorption rates within the reformer 12 can be significant. Accordingly, it is preferred that the model tracks fuel accumulation within the reformer 12 and estimates fuel adsorption and desorption rates to determine the fuel availability for chemical reactions within the reformer 12.

While a significant temperature gradient generally exists within the reformer 12, the inventor has found that the purposes of the invention can be achieved using a single average temperature for the reformer 12.

Reaction (2) can be considered to proceed at a rate and to an extent dependent on temperature and the availability of fuel after the effect of Reaction (1). Reaction (3) can be considered third, and has the least impact on a thermal model. Reaction kinetics, adsorption rates, and desorption rates depend on reactor geometry and composition and are best determined experimentally for a particular system.

A model prediction can be compared to a sensed value, which may be a sensed temperature. A sensed temperature can be, for example, any of the reformer 12 exhaust, the reformer 12 or the exhaust within a passage of the reformer 12. The temperature can be at any point in the reformer 12, but is preferably a point near the center of the reformer 12 when the lumped parameter model is used. The measured temperature can be used in a direct comparison with a model prediction. Alternatively, the measured temperature can be used to infer a temperature at a different position or time, which is in turn used in the comparison, as when the reformer exhaust temperature is used as an estimate for the reformer temperature, or when a measured temperature is corrected for the time delay in receiving the temperature measurement.

In one example, the commanded fuel rate is used in a thermal model to provide an expected temperature, which is compared to a measured temperature that actually resulted from the commanded fuel rate. The comparison can be made at a single point in time, or can involve a span of time. For example, the discrepancy at time t can be characterized by the integral of the square of the difference between the expected temperature and the actual temperature over a period from $t-\Delta t$ to $t$. If the magnitude of the discrepancy exceeds a certain amount (optionally depending on relevant factors) then a fuel injection system fault is indicated.

In another example, the model can be used to determine a fuel injection rate that would provide an observed or known temperature. A temperature might be considered known if it is essentially fixed by process control. A model can then be used to find a fuel injection rate that would be expected to give the observed or known temperature. The expected fuel injection rate can then be compared to an actual fuel injection rate to determine whether a fault has occurred.

In comparing an expected value to an actual value a simple difference, an absolute difference, a squared difference, or an integral of any of the foregoing can be used, for example. Any of these differences can be compared to threshold value to determine whether a fault exists. The threshold can be fixed, or can depend on factors such as the catalytic device temperature. An appropriate threshold can be chosen by comparing the model predictions to measured values in order to determine the magnitude of differences that occur even when the fuel injection system is working properly. The threshold is set at an appropriate value above the normal difference.

Rather than a numerical difference between an expected and an actual value, the comparison used in evaluating a fault from expected and actual measurements can use other forms, such as logic or probability. For example, an expert system or a learning probabilistic model can be used. A learning probabilistic model involves the application of numerous training examples wherein all of the following are known: the expected value, the measured value, and the presence or absence of a fault. With the aid of such examples, a the probability that a fault exists can be estimated without specifying a particular fault threshold. If the probability exceeds a predetermined value, a fault can be registered.

Examples of fault responses can include, for example, recording a fault code in a memory, signaling the fault through an indicator lamp, and/or making an adjustment to the fuel injection system. As an example of an adjustment, where the difference between the expected relationship and the actual relationship is indicative of a partially clogged fuel injector, the dosing control system 41 can be instructed to compensate by opening the fuel injector to a greater degree.

In the example of FIG. 1, the catalytic device is the fuel reformer 12. The inventor's concepts are equally applicable to other catalytic devices wherein reactions of injected fuel take place. Examples of such device may include oxidation catalysts, three-way catalysts, lean NOx traps, and diesel particulate filters. The reactions of the fuel may also take place in a plurality of devices connected serially or in parallel.

The detection of faults in an exhaust fuel injection system is useful in several ways. Fault detection simplifies repairs and improves overall pollution control. Early fault detection can avoid damage to components. For example, when less fuel is injected than intended, a fuel reformer can heat more than intended—possibly to the point where it or a downstream component is damaged. One particular advantage of the present system is that it permits the detection of fuel injection system faults using only components that are likely to be otherwise required and thereby eliminates the need for additional components, such as a fuel flow meter. A fuel flow meter would add expense and would itself be subject to failure.

The inventor's concepts can be used to detect spray quality faults. For example, if due to a spray quality fault the fuel injected upstream of a reformer is atomized to a lesser extent than normal, less fuel may be available within the reformer 12 during a given period of time. In such a case, the exothermic Reaction (1) may still proceed to the same extent as when the spray is properly atomized, as Reaction (1) is primarily limited by oxygen availability, provided fuel is injected above the stoichiometric rate. On the other hand, the endothermic Reaction (2) will proceed to a lesser extent. The net effect will be greater heating of the reformer 12 and less reformate production. Excess heat production may continue after fuel injection ceases due to a greater amount of fuel absorption within the reformer 12 and greater fuel entrainment upstream of the reformer 12. These effects would not be detected by a flow meter, but could be detected using to the inventor's concepts.

Figure 2:
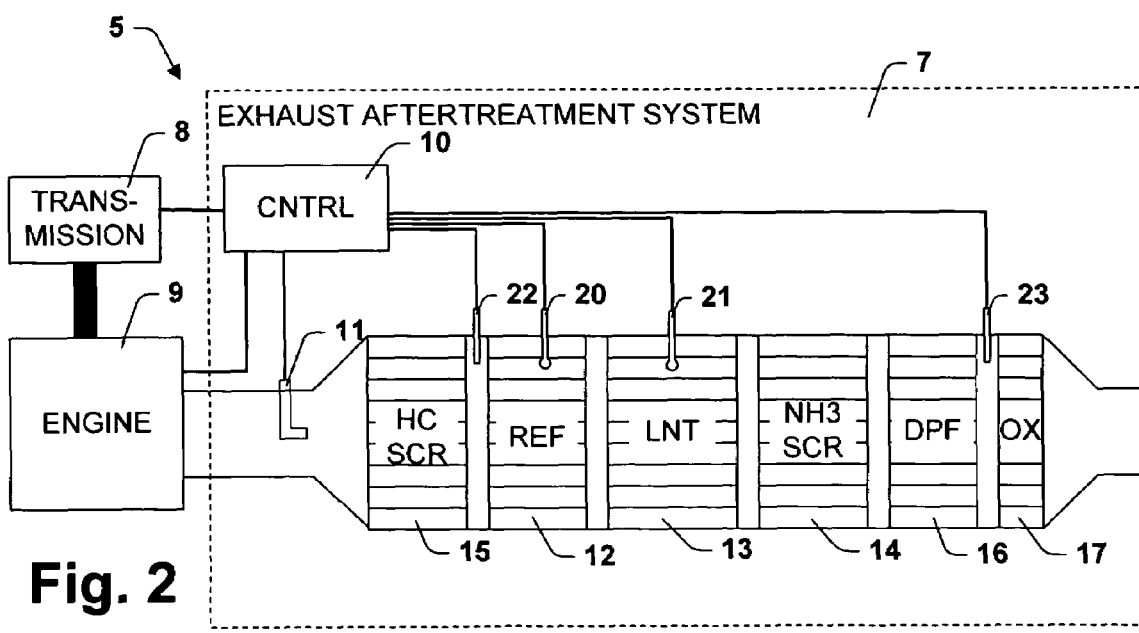
FIG. 2 is a schematic illustration of an exemplary exhaust treatment system in which various concepts of the inventor can be implemented.

FIG. 2 provides a schematic illustration of an exemplary power generation system 5 in which various concepts of the inventor can be implemented. The system 5 comprises an engine 9, a transmission 8, and an exhaust aftertreatment system 7. The exhaust aftertreatment system 7 includes a controller 10, the fuel injector 11, a lean NOx catalyst 15, the reformer 12, a lean NOx-trap (LNT) 13, an ammonia-SCR catalyst 14, a diesel particulate filter (DPF) 16, and a clean-up catalyst 17. The controller 10 receives data from several sources; including temperature sensors 20 and 21 and NOx sensors 22 and 23. The controller 10 may be an engine control unit (ECU) that also controls the transmission 8 and the exhaust aftertreatment system 7 or may include several control units that collectively perform these functions.

The transmission 8 can be of any type. In some embodiments, however, the transmission 8 is of a type that allows selection from among a large number of widely ranging torque multipliers and makes available a range of operating points at which the engine 9 can meet a given power demand. For example, the transmission 8 can be a continuously variable transmission (CVT).

The lean-NOx catalyst 15 removes a portion of the NOx from the engine exhaust using reductants, typically hydrocarbons that form part of the exhaust or have been stored by the lean-NOx catalyst 15. The DPF 16 removes particulates from the exhaust. During lean operation (a lean phase), the LNT 13 adsorbs a second portion of the NOx. The ammonia-SCR catalyst 14 may have ammonia stored from a previous regeneration of the LNT 13 (a rich phase). If the ammonia-SCR catalyst 14 contains stored ammonia, it removes a third portion of the NOx from the lean exhaust. The clean-up catalyst 17 may serve to oxidize CO and unburned hydrocarbons remaining in the exhaust.

From time-to-time, the LNT 13 must be regenerated to remove accumulated NOx (denitrated). Denitration may involve heating the reformer 12 to an operational temperature and then injecting fuel using the fuel injector 11. The reformer 12 uses the injected fuel to consume most of the oxygen from the exhaust while producing reformate. The reformate thus produced reduces NOx adsorbed in the LNT 13. Some of this NOx is reduced to $NH_3$, most of which is captured by the ammonia-SCR catalyst 14 and used to reduce NOx during a subsequent lean phase. The clean-up catalyst 17 oxidizes unused reductants and unadsorbed $NH_3$ using stored oxygen or residual oxygen remaining in the exhaust during the rich phases. During regeneration, the lean-NOx catalyst 15 may store reductant for later use.

From time-to-time, the LNT 13 must also be regenerated to remove accumulated sulfur compounds (desulfated). Desulfation may involve heating the reformer 12 to an operational temperature, heating the LNT 13 to a desulfating temperature, and providing the heated LNT 13 with a reducing atmosphere. An operational temperature for the reformer depends on the reformer design. Desulfating temperatures also vary, but are typically in the range from about 500 to about 800° C., more typically in the range from about 650 to about 750° C. Below a minimum temperature, desulfation is very slow. Above a maximum temperature, the LNT 13 may be damaged.

The lean-NOx catalyst 15 can be either an HC-SCR catalyst, a CO-SCR catalyst, or a $H_2$-SCR catalyst. Examples of HC-SCR catalysts include transitional metals loaded on refractory oxides or exchanged into zeolites. Examples of transition metals include copper, chromium, iron, cobalt, nickel, cadmium, silver, gold, iridium, platinum and manganese, and mixtures thereof. Exemplary of refractory oxides include alumina, zirconia, silica-alumina, and titania. Useful zeolites include ZSM-5, Y zeolites, Mordenite, and Ferrerite. Preferred zeolites have Si:Al ratios greater than about 5, optionally greater than about 20. Specific examples of zeolite-based HC-SCR catalysts include Cu-ZSM-5, Fe-ZSM-5, and Co-ZSM-5. A $CeO_2$ coating may reduce water and $SO_2$ deactivation of these catalysts. Cu/ZSM-5 is effective in the temperature range from about 300 to about 450° C. Specific examples of refractory oxide-based catalysts include alumina-supported silver. Two or more catalysts can be combined to extend the effective temperature window.

Where a hydrocarbon-storing function is desired, zeolites can be effective. U.S. Pat. No. 6,202,407 describes HC-SCR catalysts that have a hydrocarbon storing function. The catalysts are amphoteric metal oxides. The metal oxides are amphoteric in the sense of showing reactivity with both acids and bases. Specific examples include gamma-alumina, $Ga_2O_3$, and $ZrO_2$. Precious metals are optional. Where precious metals are used, the less expensive precious metals such as Cu, Ni, or Sn can be used instead of Pt, Pd, or Rh.

In the present disclosure, the term hydrocarbon is inclusive of all species consisting essentially of hydrogen and carbon atoms, however, a HC-SCR catalyst does not need to show activity with respect to every hydrocarbon molecule. For example, some HC-SCR catalysts will be better adapted to utilizing short-chain hydrocarbons and HC-SCR catalysts in general are not expected to show substantial activity with respect to $CH_4$.

Examples of CO-SCR catalysts include precious metals on refractory oxide supports. Specific examples include Rh on a $CeO_2$—$ZrO_2$ support and Cu and/or Fe $ZrO_2$ support.

Examples of $H_2$-SCR catalysts also include precious metals on refractory oxide supports. Specific examples include Pt supported on mixed $LaMnO_3$, $CeO_2$, and $MnO_2$, Pt supported on mixed $ZiO_2$ and $TiO_2$, Ru supported on MgO, and Ru supported on $Al_2O_3$.

The lean-NOx catalyst 15 can be positioned differently from that illustrated in FIG. 1. In one embodiment, the lean NOx catalyst 15 is upstream of the fuel injector 11. In another embodiment the lean NOx catalyst is downstream of the reformer 12, whereby the lean NOx catalyst 15 can use reformer products as reductants. In a further embodiment, the lean NOx catalyst 15 is well downstream of the LNT 13, whereby the lean NOx catalyst 15 can be protected from high temperatures associated with desulfating the LNT 13.

A fuel reformer is a device that converts heavier fuels into lighter compounds without fully combusting the fuel. A fuel reformer can be a catalytic reformer or a plasma reformer. Preferably, the reformer 12 is a partial oxidation catalytic reformer. A partial oxidation catalytic reformer comprises a reformer catalyst. Examples of reformer catalysts include precious metals, such as Pt, Pd, or Ru, and oxides of Al, Mg, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 500° C. A partial oxidation catalytic reformer is generally operative at temperatures from about 600 to about 1100° C.

The NOx absorber-catalyst 13 can comprise any suitable NOx-adsorbing material. Examples of NOx adsorbing materials include oxides, carbonates, and hydroxides of alkaline earth metals such as Mg, Ca, Sr, and Be or alkali metals such as K or Ce. Further examples of NOx-adsorbing materials include molecular sieves, such as zeolites, alumina, silica, and activated carbon. Still further examples include metal phosphates, such as phosphates of titanium and zirconium. Generally, the NOx-adsorbing material is an alkaline earth oxide. The absorbent is typically combined with a binder and either formed into a self-supporting structure or applied as a coating over an inert substrate.

The LNT 13 also comprises a catalyst for the reduction of NOx in a reducing environment. The catalyst can be, for example, one or more precious metals, such as Au, Ag, and Cu, group VIII metals, such as Pt, Pd, Ru, Ni, and Co, Cr, Mo, or K. A typical catalyst includes Pt and Rh, although it may be desirable to reduce or eliminate the Rh to favor the production of $NH_3$ over $N_2$. Precious metal catalysts also facilitate the absorbent function of alkaline earth oxide absorbers.

Absorbents and catalysts according to the present invention are generally adapted for use in vehicle exhaust systems. Vehicle exhaust systems create restriction on weight, dimensions, and durability. For example, a NOx absorbent bed for a vehicle exhaust systems must be reasonably resistant to degradation under the vibrations encountered during vehicle operation.

An absorbent bed or catalyst brick can have any suitable structure. Examples of suitable structures may include monoliths, packed beds, and layered screening. A packed bed is preferably formed into a cohesive mass by sintering the particles or adhering them with a binder. When the bed has an absorbent function, preferably any thick walls, large particles, or thick coatings have a macro-porous structure facilitating access to micro-pores where adsorption occurs. A macro-porous structure can be developed by forming the walls, particles, or coatings from small particles of adsorbant sintered together or held together with a binder.

The ammonia-SCR catalyst 14 is a catalyst effective to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substituted with metal ions such as cations of Cu, Co, Ag, Zn, or Pt, and activated carbon. Preferably, the ammonia-SCR catalyst 14 is designed to tolerate temperatures required to desulfate the LNT 13.

The particulate filter 16 can have any suitable structure. Examples of suitable structures include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers. Typical pore sizes for the filter elements are about 10 pm or less. Optionally, one or more of the reformer 12, the LNT 13, the lean-NOx catalyst 15, or the ammonia-SCR catalyst 14 is integrated as a coating or within the structure of the DPF 16.

The DPF 16 is regenerated to remove accumulated soot. The DPF 16 can be of the type that is regenerated continuously or intermittently. For intermittent regeneration, the DPF 16 is heated, using a reformer 12 for example. The DPF 16 is heated to a temperature at which accumulated soot combusts with $O_2$. This temperature can be lowered by providing the DPF 16 with a suitable catalyst. After the DPF 16 is heated, soot is combusted in an oxygen rich environment.

For continuous regeneration, the DPF 16 may be provided with a catalyst that promotes combustion of soot by both $NO_2$ and $O_2$. Examples of catalysts that promote the oxidation of soot by both $NO_2$ and $O_2$ include oxides of Ce, Zr, La, Y, and Nd. To completely eliminate the need for intermittent regeneration, it may be necessary to provide an additional oxidation catalyst to promote the oxidation of NO to $NO_2$ and thereby provide sufficient $NO_2$ to combust soot as quickly as it accumulates. Where regeneration is continuous, the DPF 16 is suitably placed upstream of the reformer 12. Where the DPF 16 is not continuously regenerated, it is generally positioned as illustrated downstream of the reformer 12. An advantage of the position illustrated in FIG. 2 is that the DPF 16 buffers the temperature between the reformer 12 and the LNT 13.

The clean-up catalyst 17 is preferably functional to oxidize unburned hydrocarbons from the engine 9, unused reductants, and any $H_2S$ released from the NOx absorber-catalyst 13 and not oxidized by the ammonia-SCR catalyst 15. Any suitable oxidation catalyst can be used. A typical oxidation catalyst is a precious metal, such as platinum. To allow the clean-up catalyst 17 to function under rich conditions, the catalyst may include an oxygen-storing component, such as ceria. Removal of $H_2S$, where required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A fault detection method, comprising:
    injecting fuel into an exhaust line using a fuel injection system comprising a fuel injector whereby the fuel mixes with exhaust;
    passing the fuel-exhaust mixture through a device that catalyzes oxidation or partial oxidation reactions of the fuel;

detecting a temperature of the device, within the device, or downstream of the device; and using the detected temperature in detecting a fault in the fuel injection system;

wherein using the detected temperature in detecting a fault in the fuel injection system comprises the application of a thermal model of a system comprising the device wherein the thermal model comprises a term relating to heat of reactions of the fuel, a term relating to heat capacity of the device, and a term relating to convective heat transfer by the exhaust.

2. A method of diagnosing a fuel injection system, comprising:

supplying fuel to a fuel reformer through the fuel injection system;

measuring a temperature of the reformer or a reformer exhaust stream;

analyzing data comprising the temperature measurement to determine whether the fuel injection system has experienced a fault; and if a fault is detected, recording the fault in a memory or signaling the fault wherein analyzing data comprising the temperature measurement to determine whether the fuel injection system has experienced a fault comprises application of a thermal model of a system comprising the device;

wherein the thermal model comprises a term relating to heat released by reactions of the fuel, a term relating to heat capacity of the device, and a term relating to convective heat transfer by the exhaust.

3. A method of diagnosing a fuel injection system, comprising:

supplying fuel to a fuel reformer through the fuel injection system; and comparing an expected relationship between a commanded fuel injection rate and a temperature to an actual relationship between the commanded fuel injection rate and the temperature and thereby checking for a fuel injection fault;

wherein the expected relationship is a model-based relationship;

wherein the model comprises a term relating to heat released or taken up by reactions of the fuel, a term relating to heat capacity of the fuel reformer, and a term relating to convective heat transfer by the exhaust.

* * * * *